(12) United States Patent
Janson

(10) Patent No.: US 7,832,514 B2
(45) Date of Patent: Nov. 16, 2010

(54) AXLE DRIVE UNIT FOR A HYBRID ELECTRIC VEHICLE

(75) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 12/026,146

(22) Filed: Feb. 5, 2008

(65) Prior Publication Data
US 2009/0197728 A1 Aug. 6, 2009

(51) Int. Cl.
B60K 6/36 (2007.10)
(52) U.S. Cl. ........... 180/65.6; 180/65.265; 903/909; 903/945
(58) Field of Classification Search ......... 180/65.21, 180/65.25, 65.265, 65.285, 65.1, 65.6, 65.7, 180/242, 243, 245, 249; 903/906, 909, 945
See application file for complete search history.

(56) References Cited

U.S. PATENT DOCUMENTS

| | | | |
|---|---|---|---|
| 6,164,400 A | 12/2000 | Jankovic et al. | |
| 6,499,549 B2 | 12/2002 | Mizon et al. | |
| 6,692,394 B2 | 2/2004 | Takenaka | |
| 6,796,412 B2 | 9/2004 | Teraoka | |
| 6,945,347 B2 | 9/2005 | Matsuno | |
| 7,121,164 B2 * | 10/2006 | Hanyu et al. | 74/661 |
| 7,328,763 B2 * | 2/2008 | Gouda et al. | 180/65.285 |
| 7,610,974 B2 * | 11/2009 | Abe | 180/65.21 |
| 7,726,430 B2 * | 6/2010 | Yang | 180/242 |
| 2003/0181281 A1 | 9/2003 | Duggan et al. | |
| 2006/0079370 A1 | 4/2006 | Kushino | |
| 2007/0093344 A1 | 4/2007 | Kira et al. | |
| 2007/0102209 A1 | 5/2007 | Doebereiner | |

* cited by examiner

*Primary Examiner*—J. Allen Shriver, II
*Assistant Examiner*—John D. Walters
(74) *Attorney, Agent, or Firm*—David B. Kelley; MacMillan, Sobanski & Todd, LLC

(57) ABSTRACT

A drive unit for a hybrid electric motor vehicle includes an engine, an electric motor/generator, a layshaft supporting a first coupler and a second coupler, a first drive path including the layshaft and the first coupler for driveably connecting and disconnecting the engine and the motor/generator, and a second drive path including the layshaft and the second coupler for driveably connecting and disconnecting the engine and an output of the drive unit, the first coupler and the second coupler being operative to connect concurrently the engine, the motor/generator and said output.

18 Claims, 7 Drawing Sheets

AXLE DRIVE UNIT FOR A HYBRID ELECTRIC VEHICLE

BACKGROUND OF THE INVENTION

1. Field of the Invention

This invention relates generally to a powertrain for a vehicle, and, more particularly, to a powertrain having multiple power sources including an electric motor for driving a set of vehicle wheels.

2. Description of the Prior Art

Hybrid electric powertrains have been developed that include an electric motor and an internal combustion (IC) engine, which can operate independently or in combination depending on the driving conditions, the state of charge of a traction battery, and the power source that most efficiently meets the current power demands imposed by the vehicle operator.

When packaging an electric motor drive unit for a rear axle it is preferable to place the motor drive unit on the rear axle centerline for best packaging efficiency.

To improve operating efficiency and to allow battery charging at zero vehicle speed, clutches or couplers are required in the ERAD unit, such as high speed disconnect clutch and mechanical drive disconnect clutch. The high speed disconnect will improve efficiency, and the mechanical drive disconnect allows battery charging at rest.

A need exists in the industry for a low-cost, hybrid electric powertrain in which operating efficiency is improved and battery charging capability is provided when vehicle speed is zero. A high speed disconnect clutch and mechanical drive disconnect clutch would improve efficiency and permit battery charging when the vehicle is stopped.

SUMMARY OF THE INVENTION

A drive unit for a hybrid electric motor vehicle driven by an engine includes an electric motor/generator, a layshaft supporting a first coupler and a second coupler, a first drive path including the layshaft and the first coupler for driveably connecting and disconnecting the engine and the motor/generator, and a second drive path including the layshaft and the second coupler for driveably connecting and disconnecting the engine and an output of the drive unit, the first coupler and the second coupler being operative to connect concurrently the engine, the motor/generator and said output.

To improve operating efficiency and to allow battery charging at zero vehicle speed, clutches or couplers are incorporated in the ERAD unit. A high speed disconnect clutch improves operating efficiency of the drive unit. A mechanical drive disconnect clutch allows an electric storage battery to be charged while the vehicle is at rest.

To minimize cost, an electric machine located in the ERAD unit provides all hybrid electric vehicle functions including electric energy generation, electric vehicle launch, electric boosting of engine power, and regenerative braking.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF TIE PREFERRED EMBODIMENT

Figure 1:
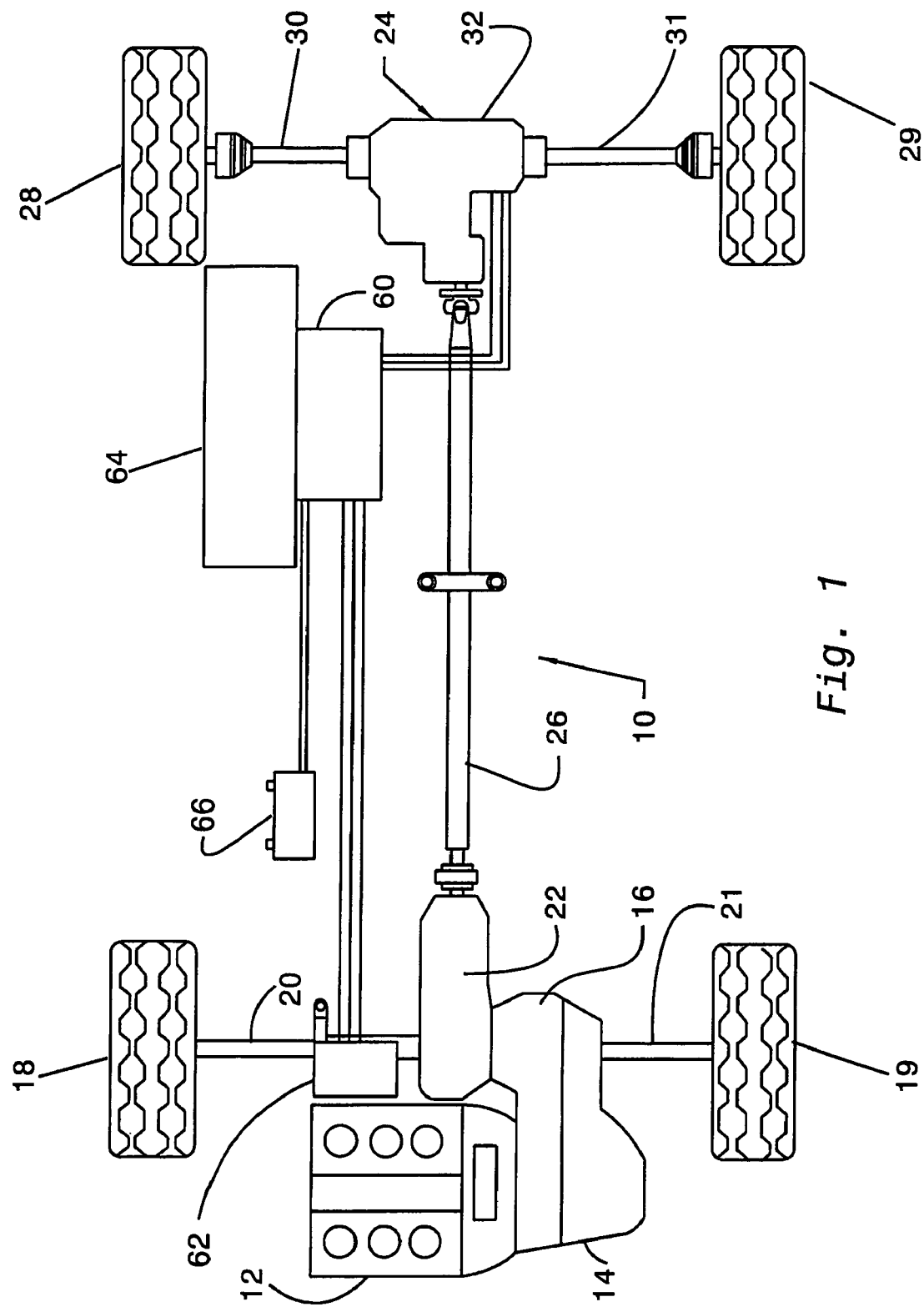
FIG. 1 is a schematic diagram of a powertrain for a hybrid electric vehicle, whose rear axle shafts are driven by an electric rear axle drive (ERAD) unit.

The powertrain 10 for a hybrid electric motor vehicle illustrated in FIG. 1 includes an IC engine 12 driving a transmission 14, which drives a final drive unit 16. The front wheels 18, 19 are supported on front shafts 20, 21. Transmission 14 may be a manual gearbox or any type of automatic transmission. The final drive unit 16 is driveably connected to a rear drive take-off unit 22, which is connected to a rear final drive unit 24, i.e., the ERAD unit, by a longitudinal prop shaft 26. The ERAD unit 24 is driveably connected to a pair of rear wheels 28, 29 by rear drive shafts 30, 31. The ERAD unit 24 includes a casing 32, which contains the inboard ends of the rear drive shafts 30, 31.

Figure 2:
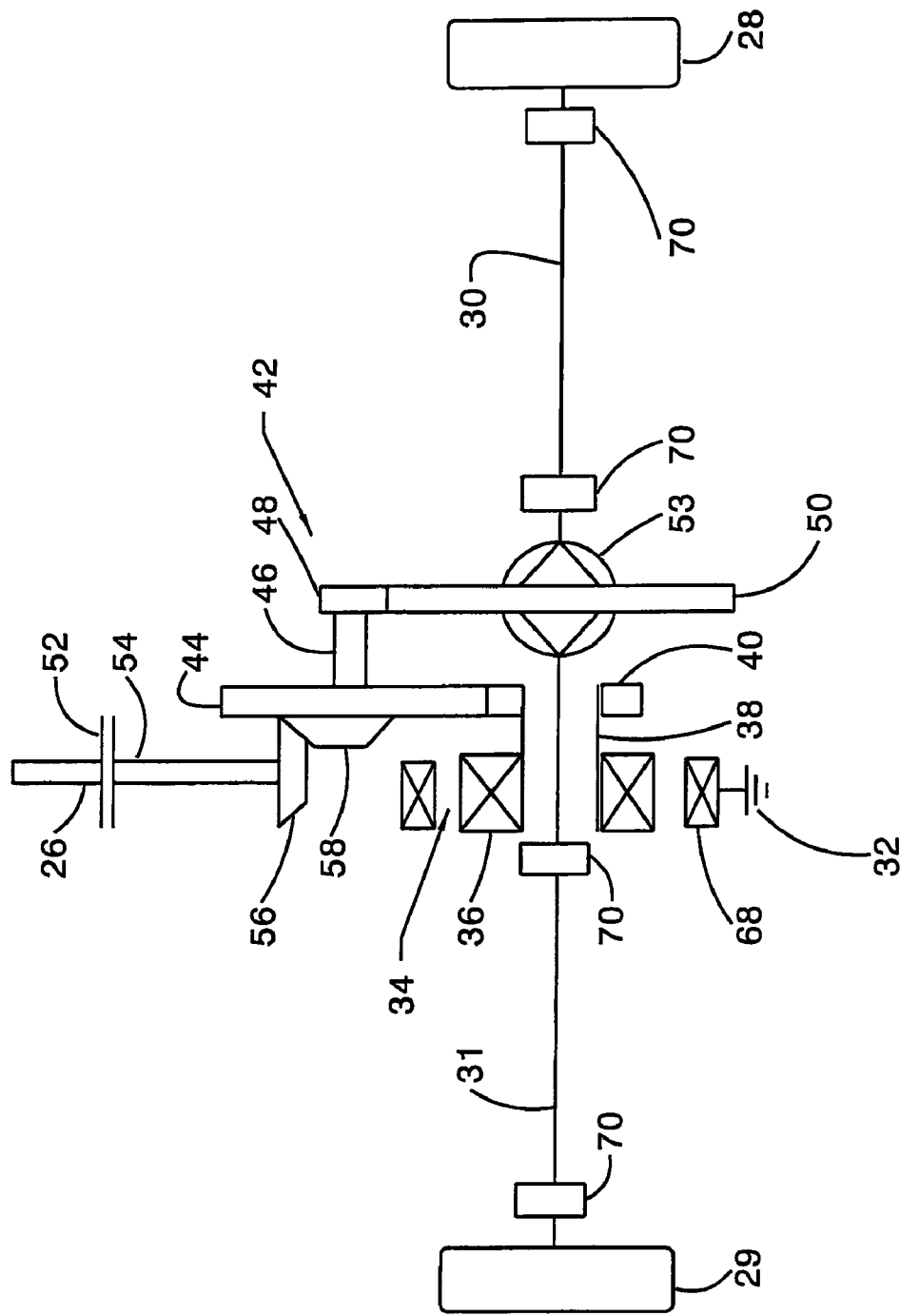
FIG. 2 is schematic diagram of the ERAD unit of FIG. 1.

FIG. 2 shows a motor/generator 34 arranged transversely in the final drive unit 24. The motor/generator 34 includes a hollow rotor 36, which is connected by a sleeve shaft 38 to an input pinion 40 of a layshaft reduction gear train 42. Input pinion 40 meshes with a large diameter gear 44 secured to a layshaft 46, which also has a small diameter gear 48 secured to it. The small diameter gear 48 meshes with a large diameter driving gear 50, which is secured to the output of the drive unit 24 and includes an inter-wheel differential mechanism 53, drive shafts 30, 31 and the rear wheels 28, 29. Drive shafts 30, 31 are driven by the differential mechanism 53. Shaft 31 extends concentrically through the rotor 36 and the sleeve shaft 38.

A coupler or clutch 52 alternately opens and closes a drive connection between prop shaft 26 and input shaft 54, which is secured to a final drive bevel pinion 56. A bevel gear 58 meshes with bevel pinion 56 and is secured to the large diameter gear 44.

The motor/generator 34 is controlled by an electronic control unit (ECU) 60. Electric power and rotating power are generated by the motor/generator 34 and by another motor/generator, an integrated starter generator 62, which alternately drives and is driven by the engine 12. Both the motor/generator 34 and the integrated starter generator 62 alternately draw electric current from, and supply electric current to a traction battery 64 and an auxiliary battery 66. The traction battery 64 is a high voltage unit. The auxiliary battery 66 is a 12V unit for the supply & control of the vehicle electrical systems.

The engine 12 drives the rear wheels 28, 29 through transmission 14, the final drive unit 16, the rear take-off unit 22, prop shaft 26, the ERAD unit 24 and the rear drive shafts 30, 31. The clutch 52 transmits drive torque to the rear wheels 28, 29 as required to maintain an appropriate torque split between the front and rear wheels. Under low vehicle speed driving conditions, the electric motor/generator 34 can be used to drive the vehicle with the engine 12 stopped, in which case the clutch 52 is disengaged and the rear wheels 28, 29 are driven only through the layshaft reduction gear train 42.

When motor/generator 34 drives the rear wheels 28, 29, sleeve shaft 38 transmits power from rotor 36 to the small diameter pinion 40, which drives the large diameter gear 44, layshaft 46, and gear 42. The input of differential mechanism 53 is driven by large diameter driving gear 50. Under heavier load at low vehicle speed driving conditions, the motor generator 34 can be used to supplement power supplied by the engine 12.

At higher vehicle speed, engine 12 is the engine for driving the wheels, and the integrated starter generator 62 and the electric motor generator 34 supplying electric current to the batteries 64, 66.

The layshaft reduction gear train 42 provides a reduction speed ratio between the motor/generator 34 and the differential 53 as well as providing a reduction speed ratio between input shaft 54 and the differential 53. Thus the layshaft 46 performs the dual task of providing reduction gearing for both the electric motor/generator 34 and the mechanical torque path from the engine 12.

Casing 32 supports the various shafts and gear elements of the layshaft reduction gear train 42 and the stator 68 of the motor/generator 34. The drive shafts 30, 31 each comprise an inner shaft extending inside the casing 32, an outer shaft outside the casing 32 extending towards a respective rear wheel 28, 29, and universal joints 70 connecting the inner and outer shafts and the outer shaft and the wheel.

Figure 3:
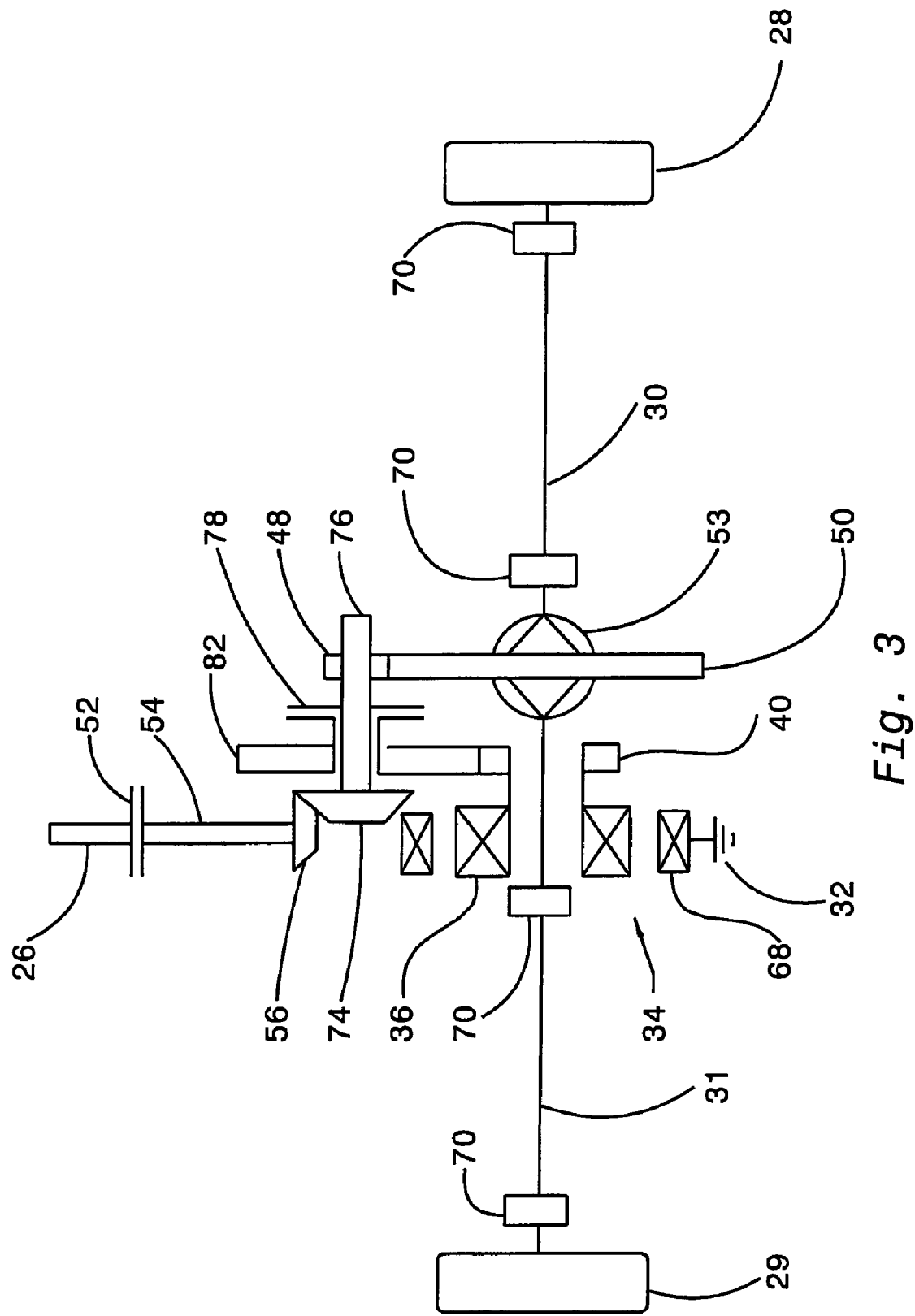
FIG. 3 is a second embodiment of the ERAD unit, which includes a high speed motor disconnect coupler.

FIG. 3 shows a second embodiment of the powertrain, which includes a bevel gear 74 meshing with bevel pinion 56 and secured to a layshaft 76, which is secured to pinion 48. The inter-wheel differential mechanism 53, which is driveably connected to pinion 48 through gear 50, drives the rear wheels 28, 29 through drive shafts 30, 31. A motor/generator disconnect coupler 78 includes a hub secured to layshaft 76 and a member, secured to a gear 82, which is journalled on layshaft 76 and meshes with pinion 40.

In operation with the coupler 52 engaged and coupler 78 disengaged, power produced by the engine 12 is transmitted through the coupler 52, bevel pinion 56, bevel gear 74, layshaft 76, pinion 48, gear 50, differential mechanism 53 and drive shafts 30, 31 to the rear wheels 28, 29.

During low motor speed operation, coupler 78 is engaged, thereby producing a second power path that transmits power produced by motor/generator 34 to the rear wheels 28, 29 through rotor 36, pinion 40, gear 82, coupler 78, layshaft 76, pinion 48, gear 50 and differential mechanism 53. During high speed motor/generator 34 operation, coupler 78 is disengaged.

Figure 4:
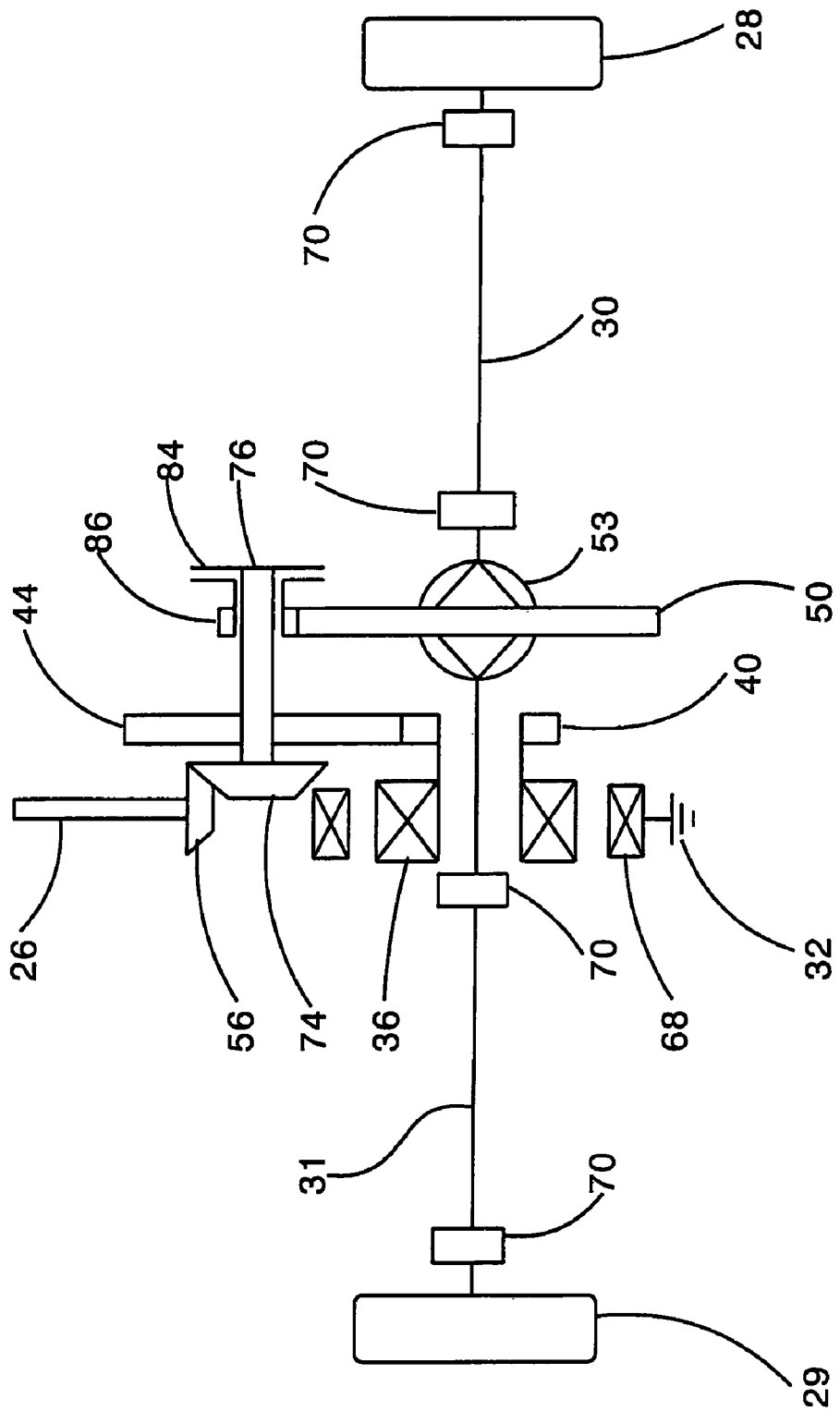
FIG. 4 is a third embodiment of the ERAD unit, which includes a mechanical drive coupler.

A third embodiment shown in FIG. 4 includes the bevel gear 74 meshing with bevel pinion 56 secured to the layshaft 76, which is secured to the large diameter driving gear 44. The inter-wheel differential mechanism 53, which is driveably connected to the pinion 86 through gear 50, drives the rear wheels 28, 29 through drive shafts 30, 31. The mechanical drive coupler 84 includes a hub secured to layshaft 76 and a member, secured to a pinion 86, which is journalled on layshaft 76 and meshes with gear 50.

In operation with the coupler 84 engaged, power produced by the engine 12 is transmitted through the bevel pinion 56, bevel gear 74, layshaft 76, mechanical drive coupler 84, pinion 86, gear 50, differential mechanism 53 and drive shafts 30, 31 to the rear wheels 28, 29.

When the vehicle is stopped with the mechanical drive coupler 84 disengaged, power produced by engine 12 is transmitted to the motor/generator 34, which is operated as a generator to produce electric energy. The power path includes prop shaft 26, bevel pinion 56, bevel gear 74, layshaft 76, gear 44, pinion 40 and rotor 36.

Figure 5:
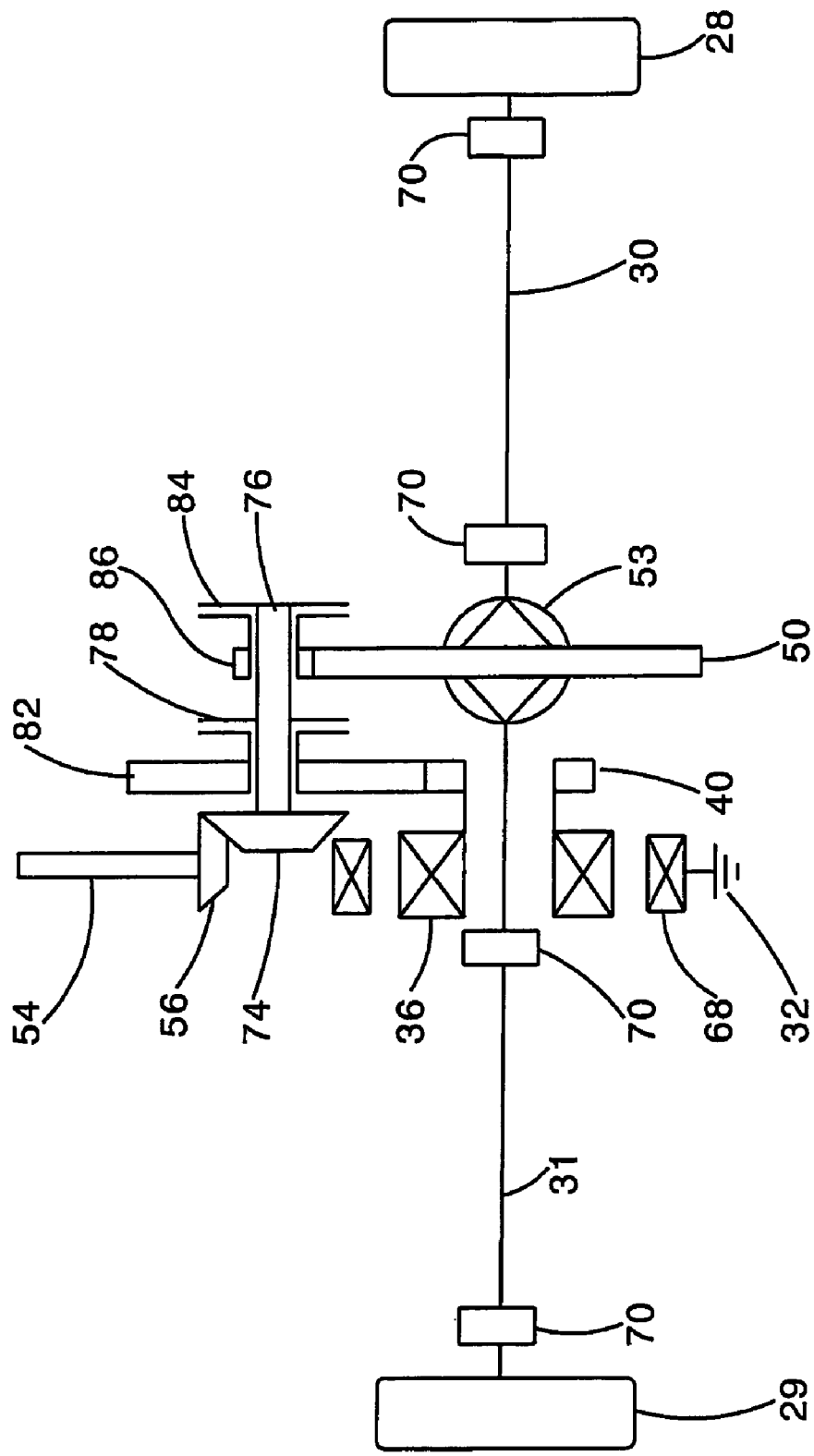
FIG. 5 is a fourth embodiment of the ERAD unit, which includes a motor disconnect coupler and mechanical drive coupler.

FIG. 5 illustrates a fourth embodiment of the powertrain. In operation, with the motor/generator disconnect coupler 78 disengaged and mechanical drive coupler 84 engaged, power produced by the engine 12 is transmitted through bevel pinion 56, bevel gear 74, layshaft 76, mechanical drive coupler 84, pinion 86, gear 50, differential mechanism 53 and drive shafts 30, 31 to the rear wheels 28, 29.

During low motor speed operation, the mechanical drive coupler 84 is engaged and motor/generator disconnect coupler 78 is engaged, thereby producing a drive path that transmits power produced by motor/generator 34 to the rear wheels 28, 29 through rotor 36, pinion 40, gear 82, motor/generator disconnect coupler 78, layshaft 76, mechanical drive coupler 84, pinion 86, gear 50 and differential mechanism 53. During high speed motor/generator 34 operation, coupler 78 is disengaged.

Figure 6A:
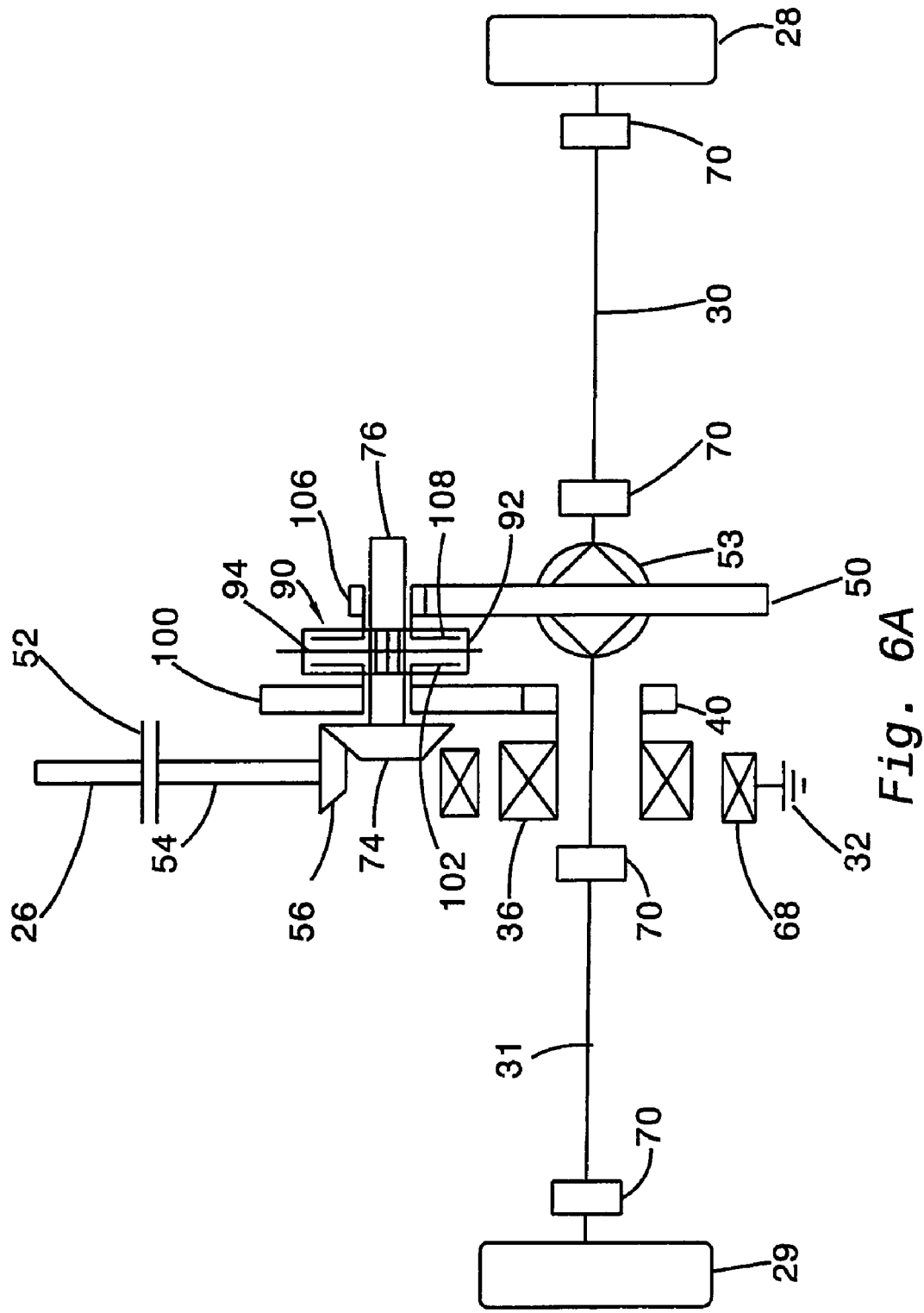
FIG. 6A is a fifth embodiment of the ERAD unit, which includes a coupler having three operating states.
Figure 6B:
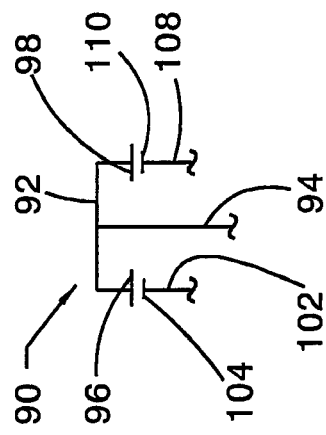
FIG. 6B is a schematic diagram of the coupler in a state producing both a high speed motor connection and a mechanical drive connection.

FIG. 6A illustrates a fifth embodiment of the powertrain, which is substantially identical to that of FIG. 5, except that the motor/generator disconnect coupler 78 and mechanical drive coupler 84 are deleted and their function is produced by a coupler 90 having three operating states. Coupler 90 is in a state producing both a high speed motor connection and a mechanical drive connection.

Coupler 90 includes a sleeve 92, which is driveably connected to layshaft 76 by a hub 94, which moves alternately leftward and rightward along the axis of the layshaft from the state shown in FIG. 6A. Sleeve 92 is formed with first and second engagement surfaces 96, 98, each preferably being axially directed spline teeth located on a radially inner surface of the sleeve.

Figure 6C:
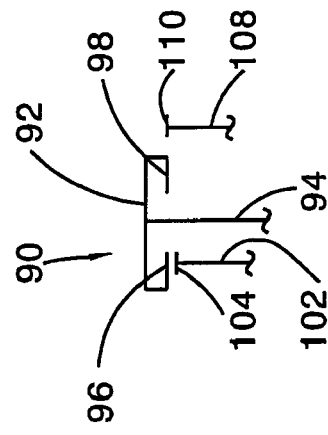
FIG. 6C is a schematic diagram of the coupler in a mechanical drive disconnect operating state.

Gear 100 meshes with pinion 40, is journalled on layshaft 76 and is formed with a hub 102 form with an engagement surface 104, which preferably includes axially directed spline teethe, located on a radially outer surface of the hub 102 and engageable with the first spleen teeth 96 when the sleeve 92 when the sleeve 92 moves leftward to the mechanical drive disconnect position shown in FIG. 6C.

Figure 6D:
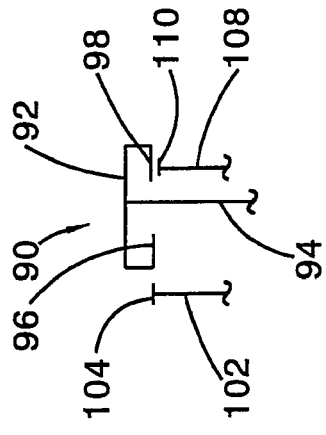
FIG. 6D is a schematic diagram of the coupler in a high speed motor disconnect operating state.

Similarly, pinion 106 meshes with gear 50, is journalled on layshaft 76 and is formed with a hub 108 formed with an engagement surface 110, which preferably includes axially directed spline teethe, located on a radially outer surface of the hub 108 and engageable with the second spline teeth 98 on sleeve 92 when the sleeve moves rightward to the high speed motor disconnect position shown in FIG. 6D.

In operation, with coupler 90 in the state shown in FIG. 6C and the vehicle is stopped, a mechanical drive path from the engine 12 to the wheels 28, 29 is disconnected or open and a drive path between engine 12 and motor/generator 34 is connected or closed, thereby permitting the motor/generator to produce electric energy when operating as generator. That drive path transmits power produced by engine 12 to the motor/generator 34 through the coupler 52, bevel pinion 56, bevel gear 74, layshaft 76, coupler hub 94, sleeve 92 hub 102, gear 100, pinion 40, and rotor 36.

During high speed motor/generator 34 operation, coupler 90 is in the state shown in FIG. 6D, wherein the motor/generator 34 is driveably disconnected from the rear wheels 28, 29 and the engine 12 is driveably connected to the wheels through a drive path that includes the coupler 52, bevel pinion 56, bevel gear 74, layshaft 76, coupler hub 94, sleeve 92, pinion hub 108, gear 50, differential mechanism 53, drive shafts 30, 31, and the rear wheels 28, 29.

When coupler 90 is in the state shown in FIGS. 6A, power produced by engine 12 and the motor/generator 34 is transmitted to the wheels 28, 29. The mechanical drive path from the engine includes coupler 52, bevel pinion 56, bevel gear 74, layshaft 76, coupler hub 94, sleeve 92, pinion hub 94, gear 50, differential mechanism 53, drive shafts 30, 31, and the rear wheels 28, 29. The drive path from the motor/generator 34 includes rotor 36, pinion 40, gear 100, gear hub 102, sleeve 92, pinion hub 108, pinion 106, gear 50 and differential mechanism 53.

In accordance with the provisions of the patent statutes, the preferred embodiment has been described. However, it should be noted that the alternate embodiments can be practiced otherwise than as specifically illustrated and described.

The invention claimed is:

1. A drive unit, comprising:
an engine;
an electric machine;
a layshaft driveably connected to the engine through a bevel pinion engaged with a bevel gear;
an output;
a coupler secured to the layshaft and including a sleeve moveable among a first state wherein the engine and the machine drive the output, a second state wherein the engine drives the machine, and a third state wherein the engine drives the output.

2. The drive unit of claim 1 further comprising:
a first gear pair including a first pinion coupled to said machine and a first gear supported on the layshaft;
a second gear pair including a second pinion supported on the layshaft and a second gear driveably connected to the output;
the bevel gear being secured to the layshaft.

3. The drive unit of claim 1 further comprising a second coupler for alternately opening and closing a drive connection between the engine and the layshaft.

4. The drive unit of claim 1 further comprising:
first and second drive shafts; and
wherein the output transmits power between the layshaft and the first and second drive shafts.

5. The drive unit of claim 4 further comprising:
first and second axially aligned drive shafts; and
wherein the machine includes a rotor and a stator aligned with the first and the second drive shafts.

6. A drive unit, comprising:
a gear driveably connected to an electric machine;
a layshaft secured to a second gear driveably connected to an engine;
an output;
a coupler secured to the layshaft and including a sleeve moveable among a first state wherein the engine and the machine drive the output, a second state wherein the engine drives the machine, and a third state wherein the engine drives the output.

7. The drive unit of claim 6, further comprising:
a pinion engaged with the gear and journalled on the layshaft, mutual engagement of the pinion and the gear causing the gear to rotate slower than the pinion.

8. The drive unit of claim 6, further comprising:
a bevel pinion driveably connectable to the engine;
the second gear is a bevel gear engaged with the bevel pinion.

9. The drive unit of claim 6, wherein the output further comprises:
a second pinion journalled on the layshaft;
a third gear engaged with the second pinion, mutual engagement of the second pinion and the third gear causing the third gear to rotate slower than the second pinion.

10. The drive unit of claim 6, further comprising:
a second pinion journalled on the layshaft; and
wherein the sleeve includes clutch teeth that engage clutch teeth on the second gear and clutch teeth on the second pinion when the coupler is in the first state.

11. The drive unit of claim 6, wherein:
a second pinion journalled on the layshaft; and
the sleeve includes clutch teeth that engage clutch teeth on the gear and disengage clutch teeth on the second pinion when the coupler is in the second state.

12. The drive unit of claim 6, wherein:
a second pinion journalled on the layshaft; and
the sleeve includes clutch teeth that engage clutch teeth on the second pinion and disengage clutch teeth on the gear when the coupler is in the third state.

13. A drive unit, comprising:
a gear driveably connected to an electric machine;
a layshaft secured to a bevel gear connectable to an engine through a bevel pinion;
a output;
a coupler secured to the layshaft and including a sleeve moveable among a first state wherein the engine and the machine drive the output, a second state wherein the engine drives the machine, and a third state wherein the engine drives the output.

14. The drive unit of claim 13, further comprising:
a pinion engaged with the gear and journalled on the layshaft, mutual engagement of the pinion and the gear causing the gear to rotate slower than the pinion.

15. The drive unit of claim 13, wherein the output further comprises:
a second pinion journalled on the layshaft;
a third gear engaged with the second pinion, mutual engagement of the second pinion and the third gear causing the third gear to rotate slower than the second pinion.

16. The drive unit of claim 13, further comprising:
a second pinion journalled on the layshaft; and
wherein the sleeve includes clutch teeth that engage clutch teeth on the gear and clutch teeth on the second pinion when the coupler is in the first state.

17. The drive unit of claim 13, wherein:
a second pinion journalled on the layshaft; and
the sleeve includes clutch teeth that engage clutch teeth on the gear and disengage clutch teeth on the second pinion when the coupler is in the second state.

18. The drive unit of claim 13, wherein:
a second pinion journalled on the layshaft; and
the sleeve includes clutch teeth that engage clutch teeth on the second pinion and disengage clutch teeth on the gear when the coupler is in the third state.

* * * * *